United States Patent [19]

Kang et al.

[11] Patent Number: 5,347,876

[45] Date of Patent: Sep. 20, 1994

[54] GAS FLOWMETER USING THERMAL TIME-OF-FLIGHT PRINCIPLE

[75] Inventors: Sukhvinder S. Kang, Rochester, Minn.; Bharatan R. Patel, Etna, N.H.; Kirankumar M. Kothari, Hoffman Estates, Ill.

[73] Assignee: Gas Research Institute, Chicago, Ill.

[21] Appl. No.: 817,656

[22] Filed: Jan. 7, 1992

[51] Int. Cl.$^5$ .......................... G01F 1/68; G01F 7/00
[52] U.S. Cl. .................. 73/861.95; 73/195; 73/204.21
[58] Field of Search ............. 73/861.95, 204.21, 202.5, 73/195

[56] References Cited

U.S. PATENT DOCUMENTS

| | | | |
|---|---|---|---|
| 3,374,673 | 3/1968 | Trageser | 73/204.21 |
| 3,648,518 | 3/1972 | Hans et al. | |
| 3,820,393 | 6/1974 | McGunigle | 73/861.95 |
| 3,842,670 | 10/1974 | Brain | |
| 3,922,912 | 12/1975 | Bradbury et al. | 73/861.95 |
| 4,244,217 | 1/1981 | Ledbetter | |
| 4,357,830 | 11/1982 | Kohama et al. | |
| 4,399,697 | 8/1983 | Kohama et al. | |
| 4,483,200 | 11/1984 | Togawa et al. | 73/861.95 |
| 4,788,860 | 12/1988 | Kiske | |
| 5,014,552 | 5/1991 | Kamiunten et al. | 73/204.21 |

FOREIGN PATENT DOCUMENTS 0206716  11/1984  Japan ................. 73/204.21

OTHER PUBLICATIONS

Yasuda et al., "Development of Small-Sized Fluidic Gas Flowmeter", 1989 International Gas Research Conference, pp. 261-271.
Bradbury et al., "A pulsed-wire technique for velocity measurements in highly turbulent flows", J. Fluid Mech, 49:657-691 (U.K. 1971).
Tombach, "An Evaluation of the Heat Pulse Anemometer . . . ", The Review of Scientific Instruments, 44:141-148 (U.S.A. 1973).
Skinner et al., "Low-speed heat-pulse anemometer", Rev. Sci. Instrum., 53(3):342-348 (U.S.A. 1982).
Rivetti et al., "Helium flowrate transducers for space applications", Institute of Metrology (Italy 1990).
Bloom, "Accurately Measuring Ultralow Flow", Machine Design, pp. 103-107 (U.S.A. 1990).
Westphal et al., "A New Proble for Measurement of Velocity . . . ", Journal of Fluids Engineering, 103:478-482 (U.S.A. 1981).

Primary Examiner—Herbert Goldstein
Attorney, Agent, or Firm—James Creighton Wray

[57] ABSTRACT

A temperature time-of-flight (TOF) sensor is combined with a nozzle of known flow area to create a TOF flowmeter. The TOF measured by the flow sensor provides a measure of gas volumetric flow rate. A TOF sensor has of a pulse heated wire and a single temperature sensor downstream of the wire. This single temperature sensor arrangement allows the accurate measurement of gas velocities much lower than the previously demonstrated limit of 0.3 m/s. The TOF sensor combined with a nozzle creates a new device such that the TOF measured with this device provides a measure of the gas flow rate rather than just the gas velocity. More than one nozzle in series is combined to achieve high flow measuring ranges. Compensation for variations in the thermophysical properties of the gas being metered is provided by pulsing the heated wire and measuring sensor outputs when both are immersed in the gas at zero velocity.

16 Claims, 3 Drawing Sheets

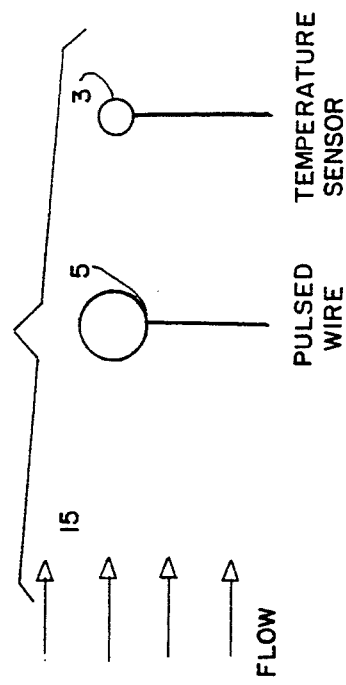
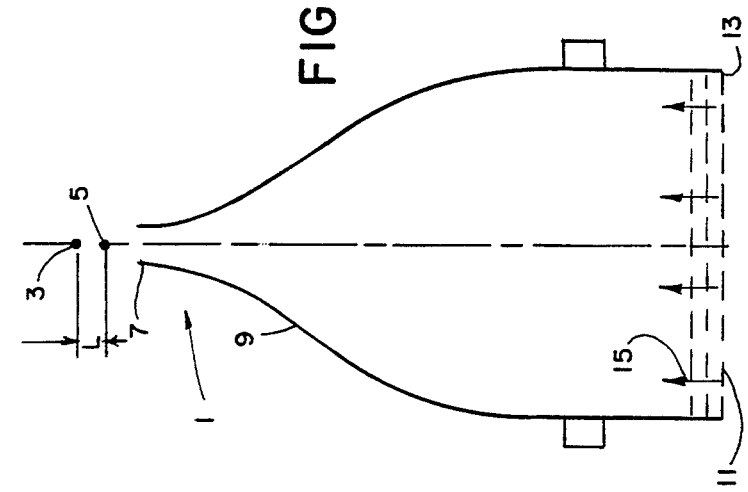
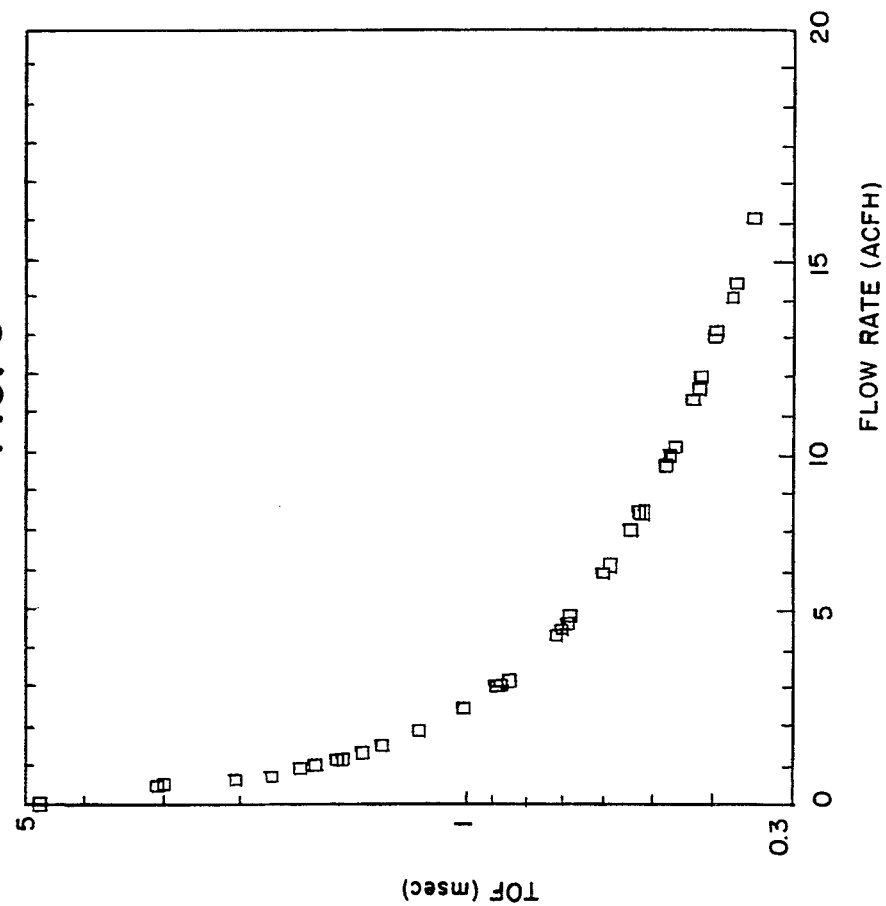

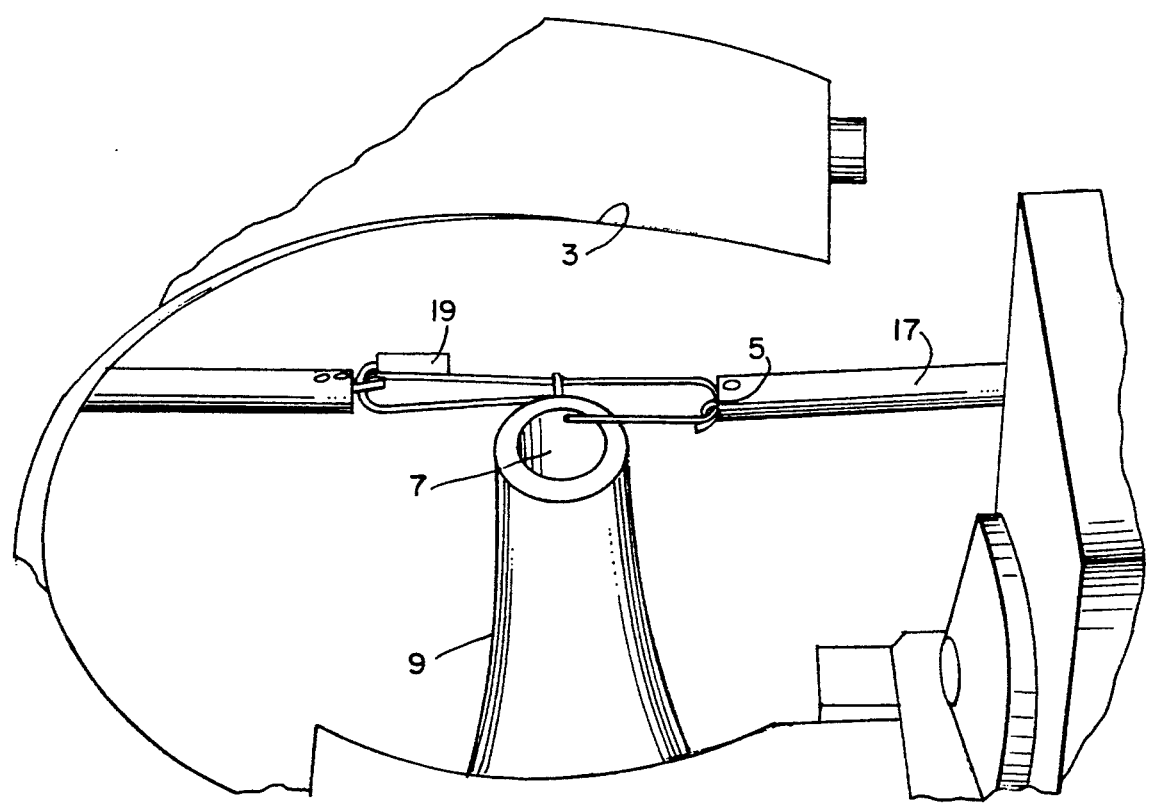
FIG. 3
FIG. 4
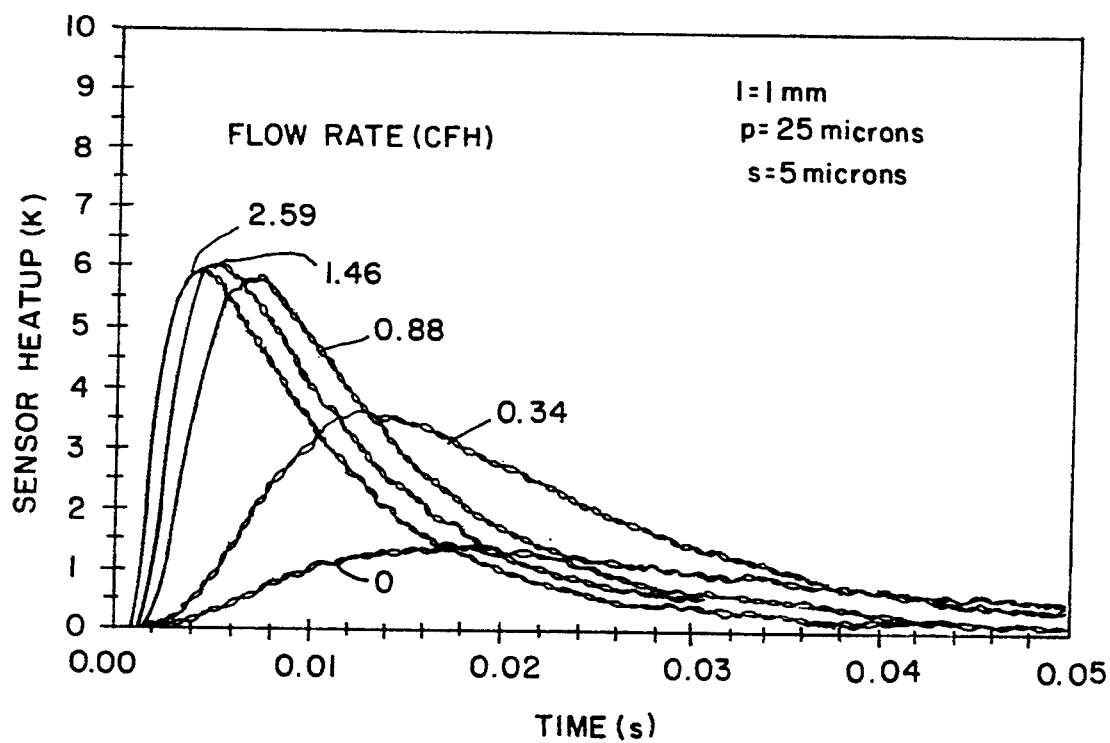

□ AIR    + ARGON

GAS FLOWMETER USING THERMAL TIME-OF-FLIGHT PRINCIPLE

BACKGROUND OF THE INVENTION

This invention relates to gas velocity and flowmeters.

Velocity measurement devices based on the thermal time-of-flight principle have previously been demonstrated by Bradbury (1971) for turbulent flow measurements and by Wesphal (1981) for measurement of wall shear stresses in gas flow boundary layers. Both of those devices have temperature sensors upstream as well as downstream of the pulse heated wire so as to measure flow direction as well as velocity. That implementation, however, prevents the measurement of gas velocities lower than about 0.3 m/s as reported by both authors. The ability to measure the very low gas velocities is critical in achieving a high velocity measurement range. A high rangeability is essential for residential gas metering applications for natural gas.

A need exists for highly accurate meters which measure gas velocities and flow over wide ranges, and which compensate for variations in gas properties.

SUMMARY OF THE INVENTION

This invention provides a new gas flowmeter based on the thermal time-of-flight (TOF) concept. A gas flow sensor based on the TOF concept is shown in FIG. 1. The TOF sensor consists of a pulse heated wire and a temperature sensor positioned at a known distance from the pulse heated wire. The wire is made of a metal alloy that can be heated by passing an electric current through it. A short duration current pulse is periodically applied to heat the wire. Heat flows from the wire to the surrounding gas starting from the time the current pulse is applied. When there is a flow of gas from the wire towards the sensor, the flow transports the heated gas to the sensor by convection. The time interval between the application of the current pulse and the arrival of the heated gas at the temperature sensor is called the "Time-of-Flight" (TOF). Because the distance between the pulsed wire and the temperature sensor is fixed, the TOF provides a measure of the gas flow velocity. When there is no gas flow, the heat reaches the temperature sensor by thermal diffusion through the gas so that the TOF is finite even at zero gas velocity.

The present invention combines the TOF sensor with a nozzle of known flow area to create a TOF flowmeter. In this new arrangement, the TOF measured by the flow sensor provides a measure of gas volumetric flow rate rather than just gas velocity.

The present invention provides a TOF sensor which consists of a pulse heated wire and a single temperature sensor downstream of the wire. This single temperature sensor arrangement allows the accurate measurement of gas velocities much lower than the previously demonstrated limit of 0.3 m/s; in fact, this invention has demonstrated repeatable TOF even at zero velocity.

The present invention has combined the TOF sensor with a nozzle to create a new device such that the TOF measured with this device provides a measure of the gas flow rate rather than just the gas velocity. More than one nozzle in series is combined to achieve very high flow measuring ranges.

This invention also provides a means to substantially compensate for variations in the thermophysical properties of the gas being metered. The ability to automatically compensate for variations in gas properties is critical for natural gas metering because the composition of the gas differs from well to well. Gas properties change with gas composition.

A preferred gas flowmeter comprises a nozzle with a narrowed throat. A pulse heated wire is positioned near the throat for heating gas flowing through the nozzle and flowing through the throat. A temperature sensor is positioned at a known distance downstream from the pulse heated wire for sensing temperature of gas adjacent the temperature sensor.

In one embodiment, a pulse heated wire is positioned downstream from the nozzle throat. The nozzle has an inlet and a screen and baffle are positioned in the inlet for controlling flow through the nozzle.

In a preferred embodiment, a disk is positioned in the throat of a nozzle and the disk has a hole commensurate with the throat. The pulse heated wire is connected to an upstream side of the disk and extends into the throat of the nozzle. The temperature sensor is connected to a downstream side of the disk and extends into the throat of the nozzle.

In a preferred extended range flowmeter, the nozzle is a two-stage nozzle, the first stage having a relatively large inlet and a smaller throat, and the second stage having an inlet commensurate with the throat of a first stage and having a smaller outlet throat. The pulse heated wire and temperature sensor comprise a first pulse heated wire and temperature sensor mounted in the throat of the first nozzle, and further comprise a second pulse heated wire positioned in the throat of the second stage and a second temperature sensor positioned in the throat of the second stage downstream from the second pulse heated wire.

A diffuser extends downstream from the throat of the second stage.

In a preferred embodiment, first and second disks are mounted in the nozzle in the first and second stage throats respectively. The first disk has a first hole commensurate with the first stage throat, and the pulse heated wire and the sensor extend across the hole into the throat of the first stage. The second disk is mounted at the throat of the second stage and has a hole commensurate with the throat of the second stage. The second pulse heated wire and second temperature sensor are mounted within the hole of the second disk and extend into the throat of the second stage.

One preferred time-of-flight sensor has a pulse heated wire and a single temperature sensor positioned downstream of the pulse heated wire at a predetermined distance for accurately measuring gas velocities below 0.3 meters per second and down to 0 velocity.

A preferred pulse heated wire has a diameter of about 25 micrometers and a length of about 2 millimeters and is constructed of tungsten. The sensor comprises a tungsten resistance thermometer having a diameter of about 5 micrometers and a length of about 1.25 millimeters.

The pulse heated wire and sensor are positioned parallel to each other and are separated by a distance of about 1 millimeter in the direction of flow.

In one preferred embodiment, a nozzle has a relatively large inlet and a smaller throat, which is positioned adjacent the pulse heated wire.

This invention provides a method of compensating for variations in thermophysical properties of gas. Pulse heating a wire in a gas with zero velocity and sensing temperature change in a temperature sensor spaced slightly from the pulse heated wire and immersed in the gas at zero velocity establishes a gas factor. Later measurements of velocity and flow are compensated according to the zero velocity measurements.

These and further and other objects and features of the invention are apparent in the disclosure, which includes the above and ongoing written specification, with the claims and the drawings.

BRIEF DESCRIPTION OF THE DRAWINGS

FIG. 1 is a schematic of a TOF flow sensor.

FIG. 2 is a schematic of a laboratory breadboard TOF flowmeter.

FIG. 3 is a photograph of TOF flowmeter laboratory hardware.

FIG. 4 is a typical TOF sensor response following a heat pulse to the pulser.

FIG. 5 is TOF flowmeter test data with air flow.

DETAILED DESCRIPTION OF THE DRAWINGS

Figure 6:
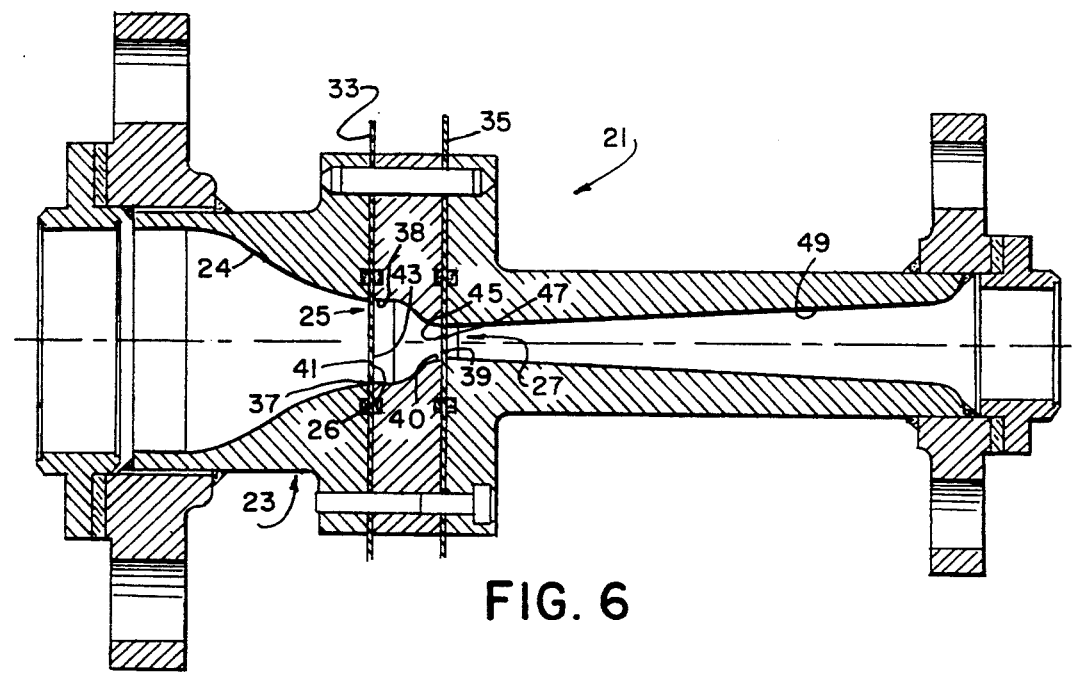
FIG. 6 is a high flow rangeability TOF flowmeter.

FIG. 1 shows a sensor 3 and a pulser 5 for measuring velocity of gas 15.

FIG. 2 shows a flowmeter 1 with a sensor 3 spaced a distance L from a pulser 5. The pulser is positioned near the discharge opening 7 of a converging nozzle 9. A screen and baffles 11 at the inlet 13 of nozzle 9 smooth the flow of gas 15 at the entry.

The schematic of a laboratory breadboard model of the TOF flowmeter is shown in FIG. 2. It consists of a 25 $\mu m$ diameter 2 mm long tungsten pulse heated wire (pulser) with a 5 $\mu m$ diameter 1.25 mm long tungsten resistance thermometer (sensor) 3. The pulser and sensor wires are positioned parallel to each other and are separated by a distance L of about 1 mm in the direction of flow. This TOF device was calibrated against a known gas flow rate through a 5.5 mm diameter nozzle.

FIG. 3 shows a close-up photograph of the actual experimental hardware. The tip 7 of the nozzle 9 is at the center of the photograph. The pulsed wire 5 is located at the tip of the prongs 17 on the right hand side of the nozzle, while the sensor 3 is located at the tip of the prongs 19 on the left hand side.

FIG. 4 shows the typical response of the sensor following a short current pulse applied to the pulser for a range of air flow rates through the nozzle. TOF is defined as the time from the start of the heat pulse to the time at which the sensor heats up by a fixed temperature. FIG. 5 shows the measured TOF as indicated by a 2° C. temperature rise of the sensor, versus air flow rate over the range from 0 to 15 CFH. With the ability to measure TOF to within 1 $\mu s$, the measurement uncertainty of the breadboard device is estimated to be less than ±0.5 percent of reading over the 0.25 to 15 CFH flow rate range. In initial tests, the flow rate versus TOF data was found to be repeatable within the expected uncertainty band. While the breadboard configuration is suited for the 0 to 15 CFH flow range, the invention can be applied up to 200 CFH and beyond. For example, the desired residential natural gas metering range of 0.25 to 200 CFH is provided by using two TOF devices in different diameter nozzles in series.

FIG. 6 shows one embodiment of a high rangeability TOF flowmeter 21. The configuration shown consists of a two-stage nozzle 23 with TOF sensors 25, 27 positioned at the throat of each stage 24, 26 of the nozzle. Each TOF sensor 25, 27 consists of a disk 33, 35 with a hole 37, 39 corresponding to the nozzle throats 38, 40 and with the pulser wires 41, 45 and sensor wires 43, 47 stretched across the diameter of the hole 37, 39 on either side of the disk 33, 35. A diffuser 49 is added downstream of the second stage 31 of the nozzle to recover a large fraction of the dynamic head of the gas so as to reduce the total pressure drop through the flowmeter 21.

A calibration of TOF versus flow rate (such as FIG. 5) is sensitive to the properties of the gas being metered. Since the composition and properties of natural gas differ from well to well, it is important that the flowmeter calibration be somehow compensated for variations in gas properties. The invention provides a gas properties compensation method which allows the TOF flowmeter to accurately meter gases over a wide range of gas properties. The method consists of compensating the flowmeter calibration by using the TOF measured at zero flow conditions in the gas being metered. Because those compensation measurements are made in-situ, the flowmeter does not require gas properties information to be supplied separately. This compensation scheme was verified through the flow measurements with air and argon gases. The thermophysical properties differences between argon and air are much greater than the differences expected between various samples of natural gas.

Figure 7:
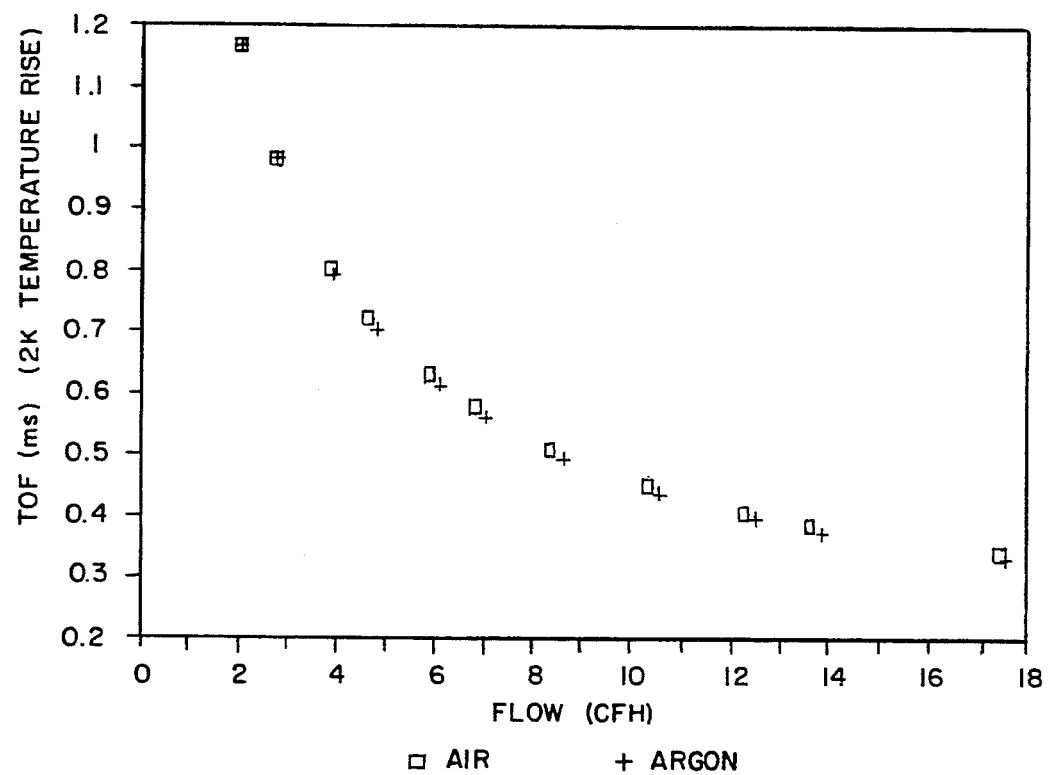
FIG. 7 is a comparison of a TOF gas properties compensation method, with test results with air and argon.

The data for air and argon are shown in FIG. 7 for the higher flow range of the breadboard flowmeter where gas property compensation errors are dominant. As the data of FIG. 7 shows, the compensation method is able to substantially compensate for variations in gas properties between air and argon. That data shows that, by using a device calibrated in air and compensated for gas properties with the present method, the flow rate of argon can be measured with an error less than ±2.5 percent of reading. That result, which agrees with analysis predictions, gives confidence in the analysis prediction of only a ±1 percent error for gas properties ranging from air to methane. Since different natural gas samples are expected to have less property differences than between air and methane, the measurement accuracy for natural gas metering is provided.

Those test results from laboratory devices confirm the performance capabilities of this new flow metering method. A single sensor TOF devices senses flows from zero velocity and up. A new flowmeter consisting of a TOF device combined with a nozzle has the ability to accurately measure gas flows over a wide flow rate range. A method compensates for gas property differences between different gases.

While the invention has been described with reference to specific embodiments, modifications and variations of the invention may be constructed without departing from the scope of the invention, which is defined in the following claims.

We claim:

1. A gas flowmeter, comprising a nozzle having a narrowed throat, a pulsatively heated wire positioned near the throat for heating gas flowing through the nozzle and flowing through the throat, a temperature sensor positioned at a known distance downstream from the pulsatively heated wire for sensing temperature of gas adjacent the temperature sensor, further comprising a disk positioned in the throat of the nozzle, wherein the disk has a hole commensurate with the throat, the pulsatively heated wire is connected to an upstream side of the disk and extends into the throat of the nozzle, and wherein the temperature sensor is connected to a downstream side of the disk and extends into the throat of the nozzle.

2. The flowmeter of claim 1, wherein the pulsatively heated wire is positioned across the nozzle throat.

3. The apparatus of claim 1, wherein the nozzle has an inlet and wherein a screen and baffle are positioned in the inlet for controlling flow uniformity through the nozzle.

4. A gas flowmeter, comprising a nozzle having a narrowed throat, a pulsatively heated wire positioned near the throat for heating gas flowing through the nozzle and flowing through the throat, a temperature sensor positioned at a known distance downstream from the pulsatively heated wire for sensing temperature of gas adjacent the temperature sensor, wherein the nozzle comprises a two-stage nozzle, a first stage having a relatively large inlet and a smaller throat, and a second stage having an inlet commensurate with the throat of the first stage and having a smaller outlet throat, and wherein the pulsatively heated wire and temperature sensor comprise a first pulsatively heated wire positioned in the throat of the second stage and a second temperature sensor positioned in the throat of the second stage downstream from the second pulsatively heated wire.

5. The apparatus of claim 4, further comprising a diffuser extending downstream from the throat of the second stage.

6. The apparatus of claim 5, further comprising first and second disks mounted in the nozzle at first and second stage throats, respectively, the first disk having a first hole commensurate with the first stage throat, and the pulsatively heated wire and the sensor extending across the hole into the throat of the first stage, wherein the second disk is mounted at the throat of the second stage, wherein the second disk has a hole commensurate with the throat of the second stage, and wherein the second pulsatively heated wire and second temperature sensor are mounted within the hole of the second disk and extend into the throat of the second stage.

7. A time-of-flight sensor, comprising a pulsatively heated wire and a single temperature sensor positioned of the pulsatively heated wire at a predetermined distance for measuring gas velocities below 0.3 meters per second and at 0 velocity, wherein a disk is positioned in a throat of a nozzle, and wherein the disk has a hole commensurate with the throat, the pulsatively heated wire is connected to an upstream side of the disk and extends into the throat of the nozzle, and wherein the temperature sensor is connected to a downstream side of the disk and extends into the throat of the nozzle.

8. The sensor of claim 7, wherein the pulsatively heated wire has a diameter of about 25 micrometers and a length of about 2 millimeters and is constructed of tungsten.

9. The apparatus of claim 7, wherein the sensor comprises a tungsten resistance thermometer having a diameter of about 5 micrometers and a length of about 1.25 millimeters.

10. The sensor of claim 7, wherein the pulsatively heated wire and sensor are positioned parallel to each other and are separated by a distance of about 1 millimeter in the direction of flow.

11. The sensor of claim 7, further comprising a nozzle having a relatively large inlet and a throat positioned adjacent the pulsatively heated wire.

12. The flowmeter of claim 7, wherein the pulsatively heated wire is positioned downstream from a nozzle throat.

13. The apparatus of claim 7, wherein a nozzle has an inlet and wherein a screen and baffle are positioned in the inlet for controlling flow through the nozzle.

14. A time-of-flight sensor, comprising a pulsatively heated wire and a single temperature sensor positioned downstream of the pulsatively heated wire at a predetermined distance for measuring gas velocities below 0.3 meters per second and at 0 velocity, wherein a nozzle comprises a two-stage nozzle, a first stage having a relatively large inlet and a smaller throat, and a second stage having an inlet commensurate with the throat of the first stage and having a smaller outlet throat, and wherein the pulsatively heated wire and temperature sensor comprise a first pulsatively heated wire and temperature sensor mounted in the throat of the first nozzle, and further comprising a second pulsatively heated wire positioned in the throat of the second stage and a second temperature sensor positioned in the throat of the second stage downstream from the second pulsatively heated wire.

15. The apparatus of claim 14, further comprising a diffuser extending downstream from the throat of the second stage.

16. The apparatus of claim 15, further comprising first and second disks mounted in the nozzle at first and second stage throats respectively, the first disk having a first hole commensurate with the first stage throat, and the pulsatively heated wire and the sensor extending across the hole into the throat of the first stage, wherein the second disk is mounted at the throat of the second stage, wherein the second disk has a hole commensurate with the throat of the second stage, and wherein the second pulsatively heated wire and second temperature sensor are mounted within the hole of the second disk and extend into the throat of the second stage.

* * * * *